United States Patent [19]
Young

[11] Patent Number: 5,642,533
[45] Date of Patent: Jul. 1, 1997

[54] WATER SAVING TOILET

[76] Inventor: Andy Y. Young, 1598 Loch Lomond La., San Jose, Calif. 95129-3737

[21] Appl. No.: 559,075

[22] Filed: Nov. 16, 1995

[51] Int. Cl.[6] .................................................. E03D 1/14
[52] U.S. Cl. .......................... 4/325; 4/346; 4/363; 4/394; 4/424
[58] Field of Search ................................ 4/324, 325, 345, 4/346, 363, 364, 366, 394, 410, 412, 415, 424

[56] References Cited

U.S. PATENT DOCUMENTS

| | | | |
|---|---|---|---|
| 4,232,408 | 11/1980 | Chen-Yuan | 4/325 |
| 4,407,026 | 10/1983 | Myers | 4/363 X |
| 5,392,470 | 2/1995 | Johnson | 4/325 |
| 5,548,850 | 8/1996 | Geeham | 4/363 X |

*Primary Examiner*—Robert M. Fetsuga
*Attorney, Agent, or Firm*—Ladas & Parry

[57] ABSTRACT

A water saving toilet comprising a water assembly and a bowl assembly. The tank assembly includes a water tank, a lid for the water tank and a water supply control mechanism provided in the water tank, a water trap control mechanism and a water flushing control mechanism. The bowl assembly includes a bowl and a water flushing system having a primary and a secondary water discharging lines. In the water saving toilet of this invention, by means of the linkage and regulation of a ball valve and a float arm in the unique regulation container provided within the water trap control mechanism, both water storage in the tank and the formation of the water trap in the bowl are under proper control such that in operation, control of the quantity of the water to be flushed is achieved by means of the dual flushing line arrangement in combination with the linkage of the levers, thus resulting in a pumping action in the line system through siphonage, that is, either a "primary operation mode" (discharging solid wastes) or a "secondary operation mode" (discharging liquid wastes) will be performed of the toilet based on the controlled water quantity entering the bowl.

6 Claims, 8 Drawing Sheets

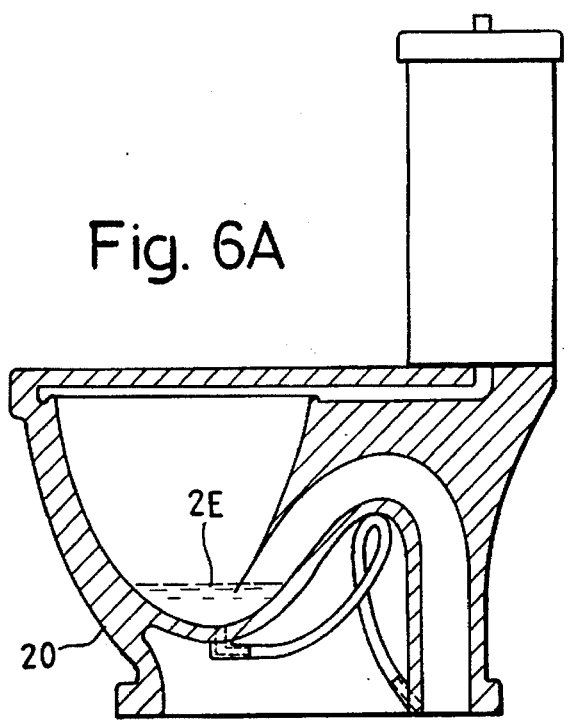
Fig. 6A
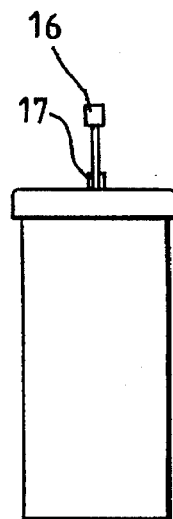
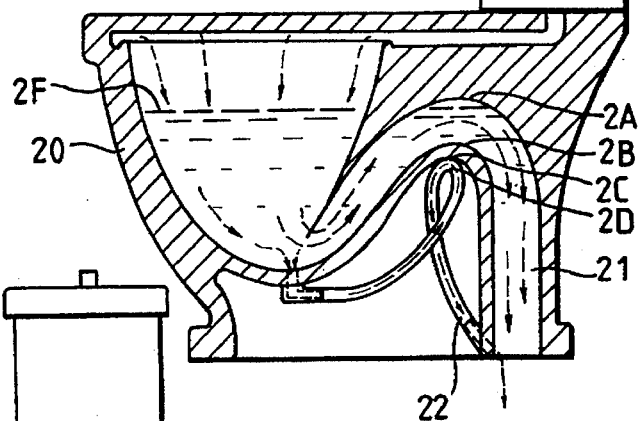
Fig. 6B
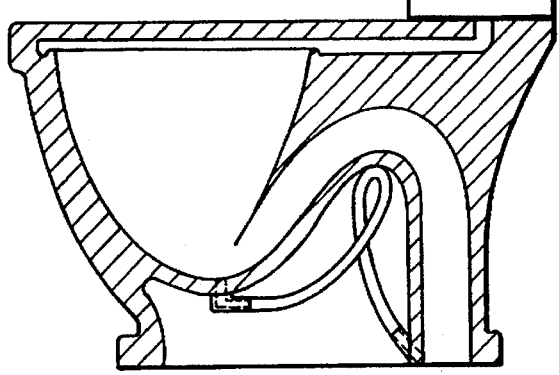
Fig. 6C

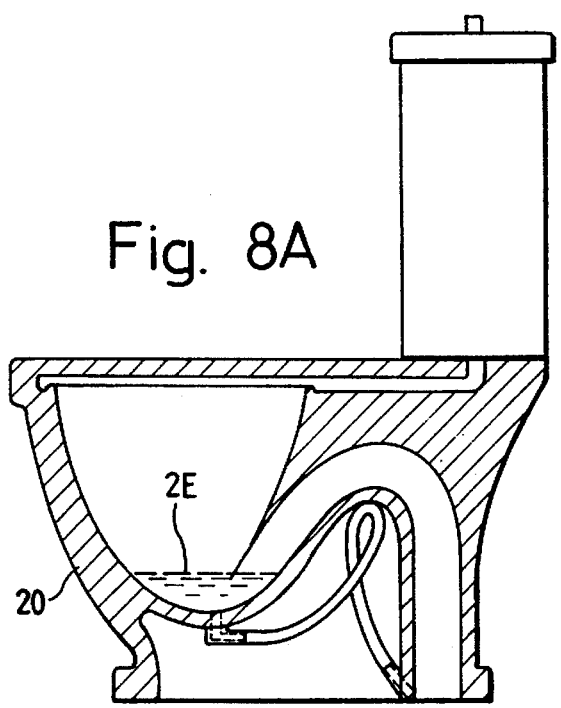
Fig. 8A
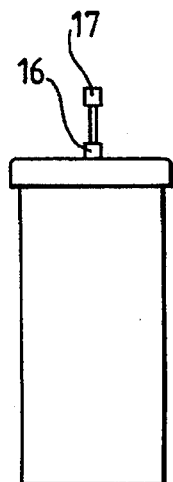
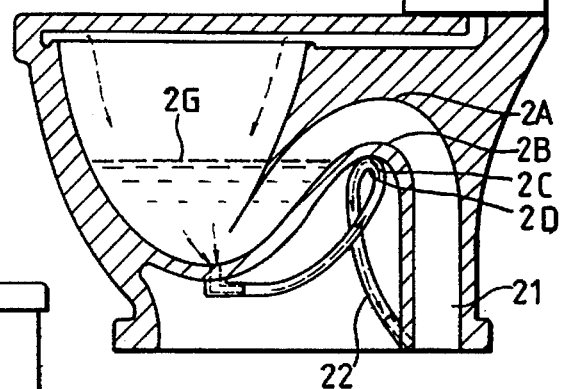
Fig. 8B
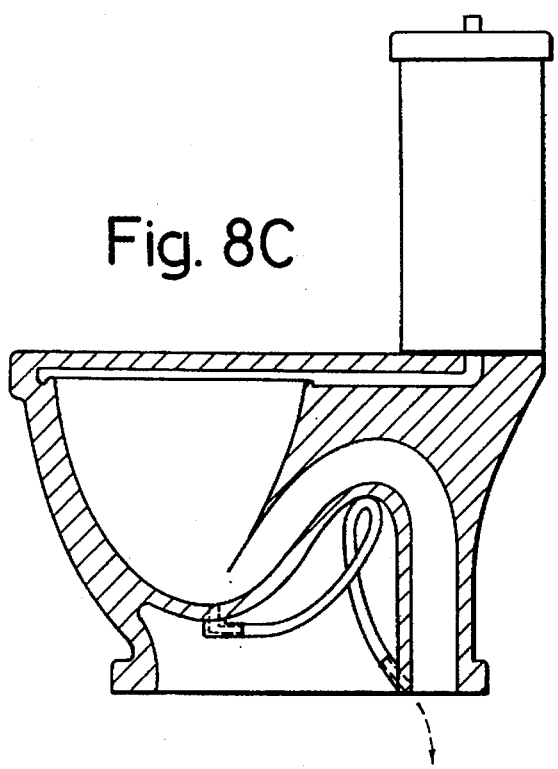
Fig. 8C

WATER SAVING TOILET

FIELD OF THE INVENTION

This invention relates to a water saving toilet and, in particular, to such a water saving toilet which serves the purpose of performing either a "primary operation mode" (discharging solid wastes) or a "secondary operation mode" (discharging liquid wastes), respectively, by means of a regulation container disposed in the water trap control mechanism of the tank assembly operating in combination with the action of a primary and a secondary discharging lines in the bowl assembly.

Specifically, this invention is characterized in the design of a unique water trap control mechanism and, in particular, in the provision of a regulation container in combination with the linkage and regulation by a ball valve and a float arm such that both water storage in the water tank and the water trap formation in the bowl are under proper control. In addition, this invention is characterized in the dual discharging line arrangement of the bowl assembly which results in a pumping action in the line system through siphonage, that is, either a "primary operation mode" (discharging solids) or a "secondary operation mode" (discharging only urine) will be performed of the toilet based on the controlled water quantity entering the bowl.

BACKGROUND OF THE INVENTION

In conventional siphon or downwash type of toilets, water is stored in a water tank. In use, all the water stored in the tank is flushed for discharging either the solid or the liquid excretion from the bowl. However, such large quantity of water is not always required for discharging the excretion. For example, a substantial difference should exist between the water quantity required for discharging urine and that for discharging excrement. That is, the entire quantity of water in the tank may be required for discharging the solid excrement while only a small quantity of water may suffice to discharge the urine. Therefore, there is apparent excessive waste of water with conventional toilets in that the same quantity of water is used for flushing whether solid excrement or liquid urine is to be discharged.

In view of the above, various types of water saving toilets have been introduced. Prior art water saving toilets have been directed primarily to changing the arrangement of the elements within the water tank, that is, the flushing control handle, the float ball, the discharging valve, and other elements in the tank are altered in structure so as to serve the purpose of two-stage flushing. Nevertheless, since there is no corresponding alteration in the design of the bowl structure, such water saving toilets still have the same practical problems as those encountered with conventional toilets as follows.

1. The discharging line system in conventional water saving toilets is of the single line design such that when water saving operation is performed for discharging urine, the quantity of water flowing into the bowl from the water tank must still be adequate for the water level in the bowl to rise above the point of the siphonage starting height of the single discharging line at the upper edge of the tube, that is the point corresponding to the point of the siphonage starting height of the single discharging line at the upper edge point 2A of the tube as shown in FIG. 1 of this invention so as to produce the intended siphonage function and effect. As a result, in such conventional water saving toilets, there is no substantial difference between the water quantity flushed in the water saving stage and that in the full flushing stage, thus resulting in a limited and apparently poor water saving effect; and 2. In conventional water saving toilets, due to the limitation of the single discharging line design employed in the bowl, the amount of the water trap for blocking off the odor from the discharging line must maintain at a level close to the lower edge of the tube under the siphonage start point 2A, that is, the point corresponding to the point of the siphonage starting height of the single discharging line at the lower edge point 2B of the tube as shown in FIG. 1 of this invention. With the water trap formed in this manner, the water quantity will be much greater than what is necessary for blocking off the odor in the single discharging line. Therefore, in the process of every full or water saving flushing operation of the conventional water saving toilets, it is necessary to form the water trap with excessive amount of water, thus resulting in considerable waste of water and only limited water saving effect.

From the foregoing, it is apparent that only insignificant water saving effect can be achieved in the water quantity for flushing and water traping with the conventional water saving toilet design. Regarging the total water consumption, conventional water saving toilets do not seem to really serve the water saving purpose.

SUMMARY OF THE INVENTION

The primary object of this invention is to provide a water saving toilet wherein the bowl assembly is provided with unique primary and secondary water discharging lines which, for making use of the siphonage principle, are particularly designed to be formed with two points of siphonage starting height, the upper edge points 2A and 2C, that is, the highest points on the curved tubes of the primary and secondary discharging lines such that the water level of the spare water trap remains below the highest point of the secondary line at the lower edge of the tube, the lower edge point 2D, which is lower than the highest point of the primary discharging line of this invention at the lower edge of the tube, the lower edge point 2B, as compared to the water trap in conventional toilets such that the water saving toilet of this invention indeed provides the water saving effect. In addition, through the function of the water discharging control mechanism, water level will be formed at different heights, such as 2F and 2G in FIGS. 6 and 8 respectively, corresponding to the different water quantities to be flushed into the bowl such that different discharging operation modes will be resulted with respect to the upper edge points 2A and 2C. Since the tube of the secondary line is much smaller in diameter than the tube of the primary line, only a small quantity of water will be necessary for the secondary discharging line to start siphonage. In operation, the primary operation mode (for discharging solids) is controlled with a primary lever and the secondary operation mode (for discharging only urine) is controlled with a secondary lever. In this manner, significant water saving effect can certainly be achieved by discharging different excretion in different operation modes.

Another object of this invention is to provide a water saving toilet which has a unique water trap control mechanism and wherein a regulation container of special design is disposed in combination with a special ball valve and other elements. With a preset capacity, when the water stored in the regulation container is discharged into the bowl and forms a water trap, this water trap can be controlled to be at a lowest level, that is, below the overflow point 2D of the secondary line at the lower edge of the tube as shown in FIG. 1, which is lower than the overflow point of the single discharging line at the lower edge of the tube corresponding to the point 2B in this invention, thus really providing a substantial water saving effect. In addition, through opening and closing the ball valve in the regulation container, the timing to make a water trap is controlled by first storing water in the regulation container and then discharging the water into the bowl. That is, the float arm connecting the float ball in the water tank will be rotated into the uppermost position and lift the ball valve up when the water level in the water tank rises high enough, then the water in the regulation container is discharged into the bowl to form a water trap. There is a delay in time between water being discharged from the main line system and water being discharged to form a water trap such that the water forming the trap will be discharged into the bowl only after all the waste in the bowl has been emptied.

The structure and features of this invention will become apparent to those skilled in the art from the following description of a preferred embodiment thereof with reference to the accompanying drawings.

BRIEF DESCRIPTION OF THE DRAWINGS

FIGS. 6A to 6C are schematic views showing the structure and operation of the bowl assembly of the water saving toilet of this invention in the primary operation mode;

FIGS. 8A to 8C are schematic views showing the structure and operation of the bowl assembly of the water saving toilet of this invention in the secondary operation mode;

DETAILED DESCRIPTION OF PREFERRED EMBODIMENT

Figure 1:
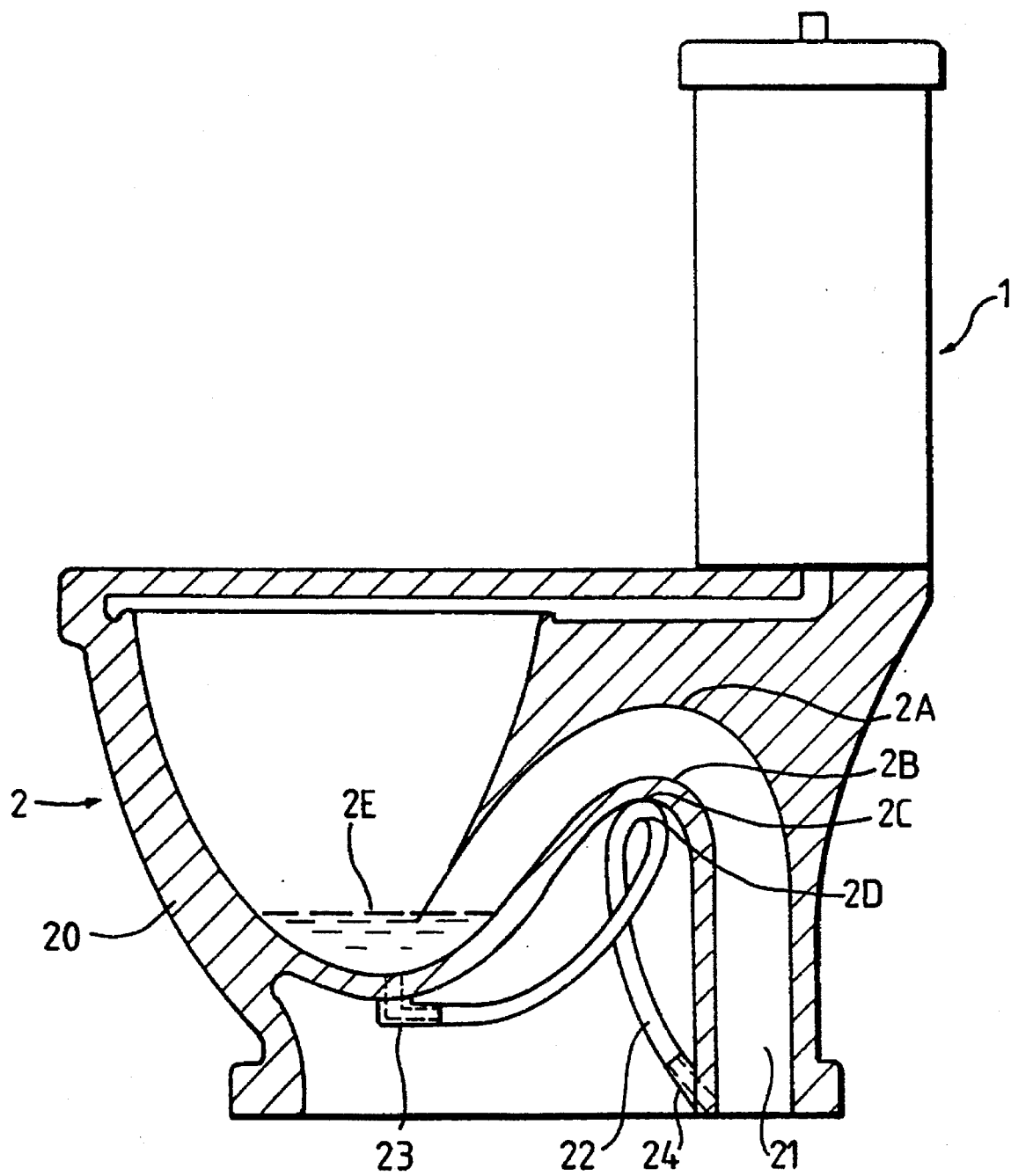
FIG. 1 is a schematic view showing the water saving toilet of this invention, with the bowl assembly having the primary and the secondary discharging lines shown in cross section.

Referring to FIG. 1, the water saving toilet of this invention comprises a water tank assembly 1 and a bowl assembly 2, the bowl assembly 2 shown in cross section consisting of a bowl 20, a water discharging line system having a primary discharging line 21 and a secondary discharging line 22, an upper joint 23 and a lower joint 24 located at the bottom of the bowl 20 and the lower end of the primary discharging line 21, respectively. The primary discharging line 21 is formed at its highest position on the tube with an upper edge point 2A and a lower edge point 2B, and the secondary discharging line 22 also is formed at its highest position on the tube with an upper edge point 2C and a lower edge point 2D. As shown in FIG. 1, the primary discharging line 21 is the same as the single water discharging line in conventional toilets, and the secondary discharging line 22 is much smaller in diameter than the primary discharging line 21 with the ends of the secondary discharging line 22 being coupled to the upper joint 23 and the lower joint 24, respectively, causing the connection between the bowl 20 and the primary discharging line 21. In addition, the secondary discharging line 22 must be disposed to have its upper edge point 2C below the upper edge point 2A of the primary discharging line 21. FIG. 1 shows that the water level 2E, i.e., the height of the water trap surface, in the standby condition must be below the lower edge point 2D of the secondary discharging line 22.

Figure 2:
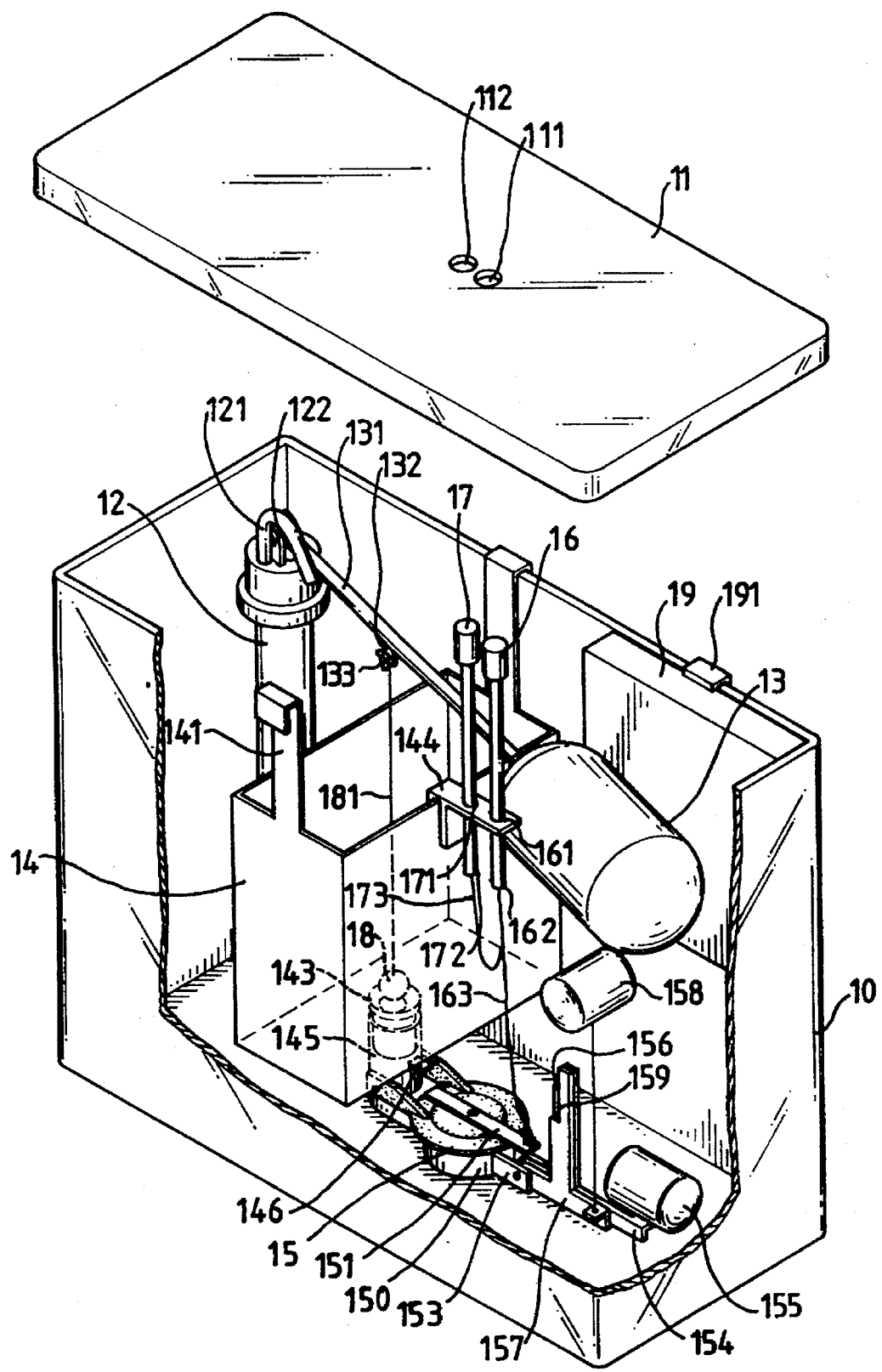
FIG. 2 is a perspective view, partly cut away, showing the water tank assembly of the water saving toilet of this invention.
Figure 3:
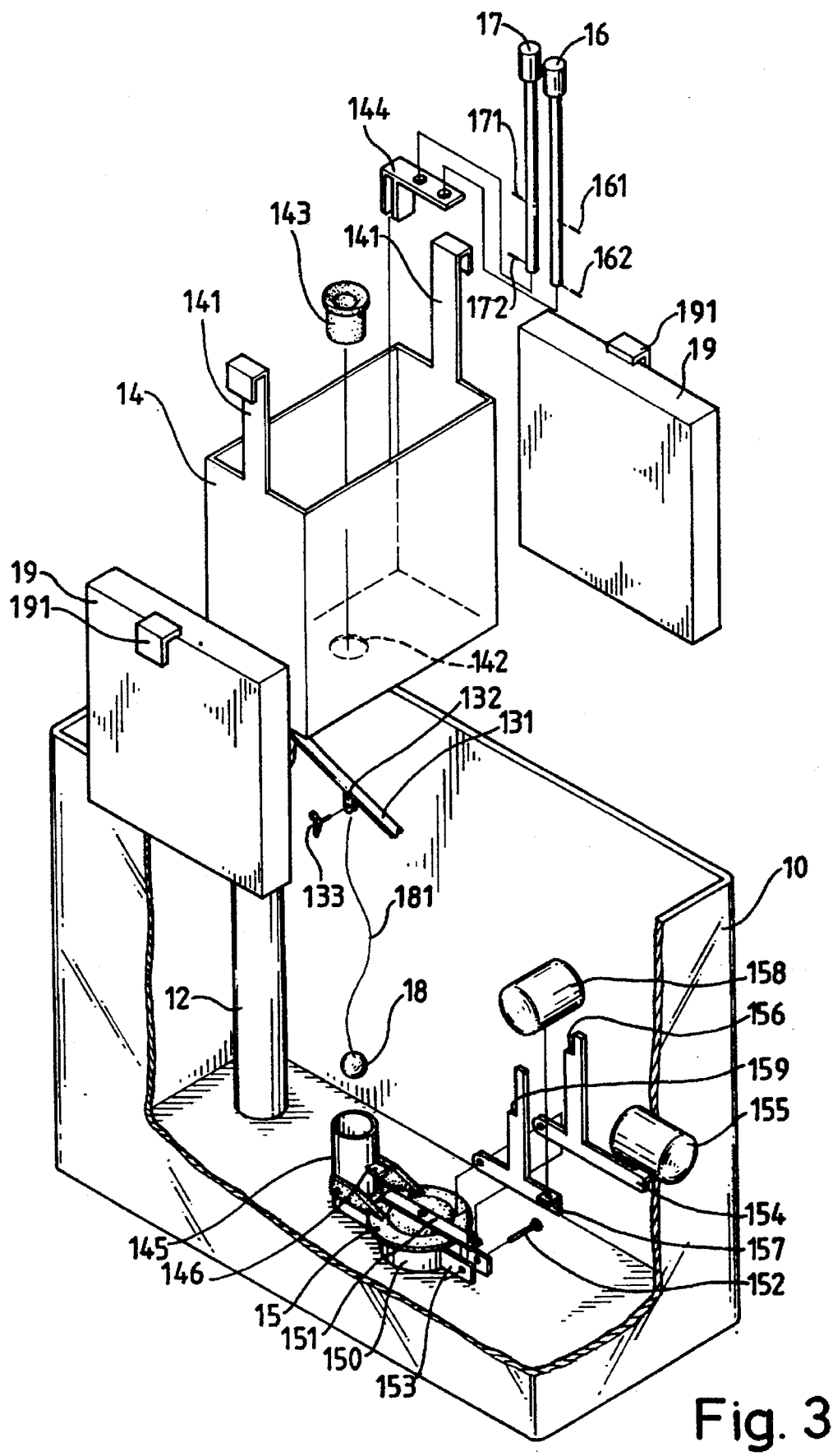
FIG. 3 is an exploded view showing the various elements of the water saving toilet of this invention.

Referring to FIGS. 2 and 3, the water tank assembly 1 comprises a water tank 10, a lid 11, a water supplying tube 12, a float ball 13, a regulation container 14, a water discharging valve 15, a primary lever 16, a secondary lever 17, a ball valve 18, and a pair of acceleration blocks 19. The water tank 10 is a box body having an open top portion, the lid 11 being provided with a pair of holes each for a primary lever 111 and a a secondary lever 112, and covering over the water tank 10 in engagement with its top edge. The water supplying tube 12 is a tube connected to the water tank 10 and an external water pipe and provided with an arcuated and angularly extending water outlet tube 121 and a pivotal seat 122. The float ball 13 is coupled to a float arm 131, the distal end being pivotally connected to the pivotal seat 122 on the top surface of the water supplying tube 12. The float arm 131 is provided with an adjusting seat 132 to which a set screw 133 is threaded. The water supplying tube 12, the float ball 13, and the float arm 131 are combined to form into a water supplying control mechanism. The regulation container 14 has a pair of fixed retaining plates 141 for fastening on the top edge of the water tank 10 such that the regulation container 14 is positioned within the water tank 10, and the regulation container 14 is provided on the bottom with an opening 142, a locating seat 143 having a central passage and a flared top mouth being fitted into the opening 142 on the bottom of the regulation container 14, a fixing seat 144 having a pair of fixing holes with said fixing seat being retained in position on the top edge of the regulation container 14. The ball valve 18 is positioned in the flared top mouth of the locating seat 143 in the regulation container 14, which is connected to an adjusting wire 181, the distal end of the adjusting wire 181 being connected to the set screw 133 on the float arm 131 such that the distance between the ball valve 18 and the locating seat 143 can be adjusted by turning the set screw 133. The regulation container 14, the locating seat 143, the ball valve 18 together with the float arm 131 and the set screw 133 thereon are combined to form into a water trap control mechanism. The water discharging valve 15 is positioned on a water discharging tube 150 communicating with the bowl 20 and provided thereon with an actuating plate 151 and coupled on one side to an overflow tube 145 communicating with the water discharging tube 150 and fitted in alignment with the lower tube of the locating seat 143 on the bottom of the regulation container 14, with a limiting block 146 extending from the outside of the overflow tube 145 for preventing the water discharging valve 15 from being excessively pivoted, and the locating seat 143 extending from the other side into which a primary control seat 154 and a secondary control seat 157 both having a horizontal and a vertical tabs can be pivoted by a pin 152. One end of the horizontal tab on the primary control seat 154 is directly coupled to the primary float 155 and the vertical tab is formed with a primary retaining groove 156. One end of the vertical tab on the secondary control seat 157 is coupled to a secondary float 158 by a rigid wire and the vertical tab is formed with a secondary retaining groove 159, the secondary retaining groove 159 being lower relative to the primary retaining groove 156. Both the primary lever 16 and secondary lever 17 have a flanged head which extend to be projected from the holes 111 and 112 on the top surface of the lid 11 for pulling by the user's hand, and which are fitted and secured, respectively, into the fitting holes on the fixing seat 144, and provided with an upper and an lower pins 161, 171 and 162, 172 for limiting the travel of actuation of the primary lever 16 and secondary lever 17. The primary lever 16 is connected from below to a primary control wire 163, the distal end thereof being connected to the free end of the actuating plate 151 on the water discharging valve 15. The secondary lever 17 is connected from below to a secondary control wire 173, the other end thereof being connected at a suitable point to the primary control wire 163 in relaxed condition. The above members are combined to form into a water discharging control mechanism. The acceleration blocks 19 have a fixed retaining seat 191 for retaining on the top edge of the water tank 10 to be positioned on the inner wall of the water tank 10. FIG. 2 shows the water tank assembly of the toilet in assembled condition.

Figure 4:
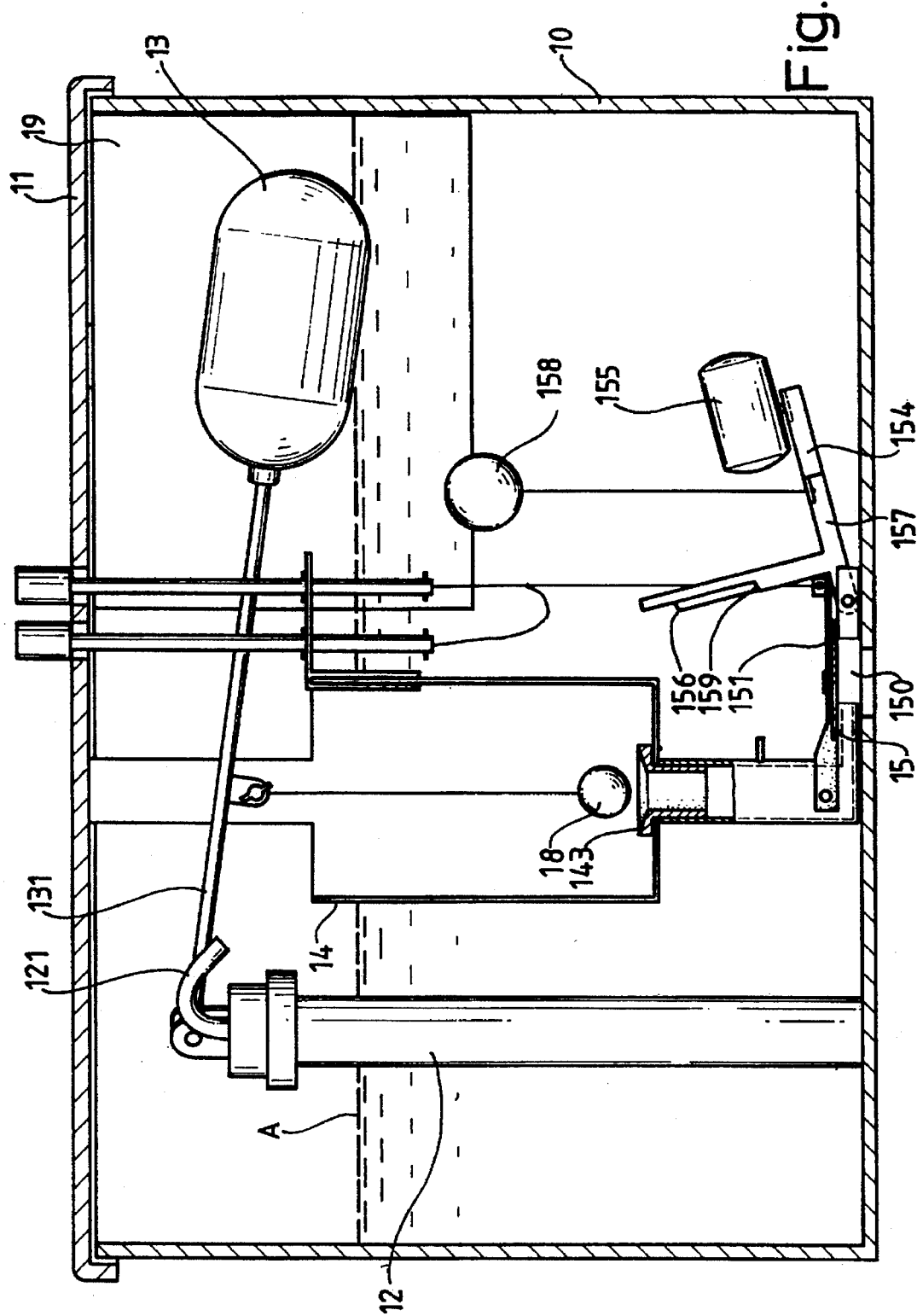
FIG. 4 is a schematic view showing the tank assembly of the water saving toilet of this invention in the standby condition.

Referring to FIG. 4, there is shown the internal structure of the water tank assembly 1 of this invention in the standby condition wherein the surface of water is at its highest level A such that the float ball 13 floats up to the highest position, thus the water supplying tube 12 being restrained for water from flowing out from the water outlet tube 121. When the float arm 131 is pivoted to the uppermost position with the water level A to lift the ball valve 18 up, causing the locating seat 143 in the regulation container 14 to be separated. Then there is no water stored in the regulation container 14. The water discharging valve 15 covers over the water discharging tube 150, and the primary control seat 154 and the secondary control seat 157 are pivoted on the pivotal seat 153 into position and inclined at an angle because of the primary float 155 and the secondary float 158 being subject to buoyancy.

Figure 5:
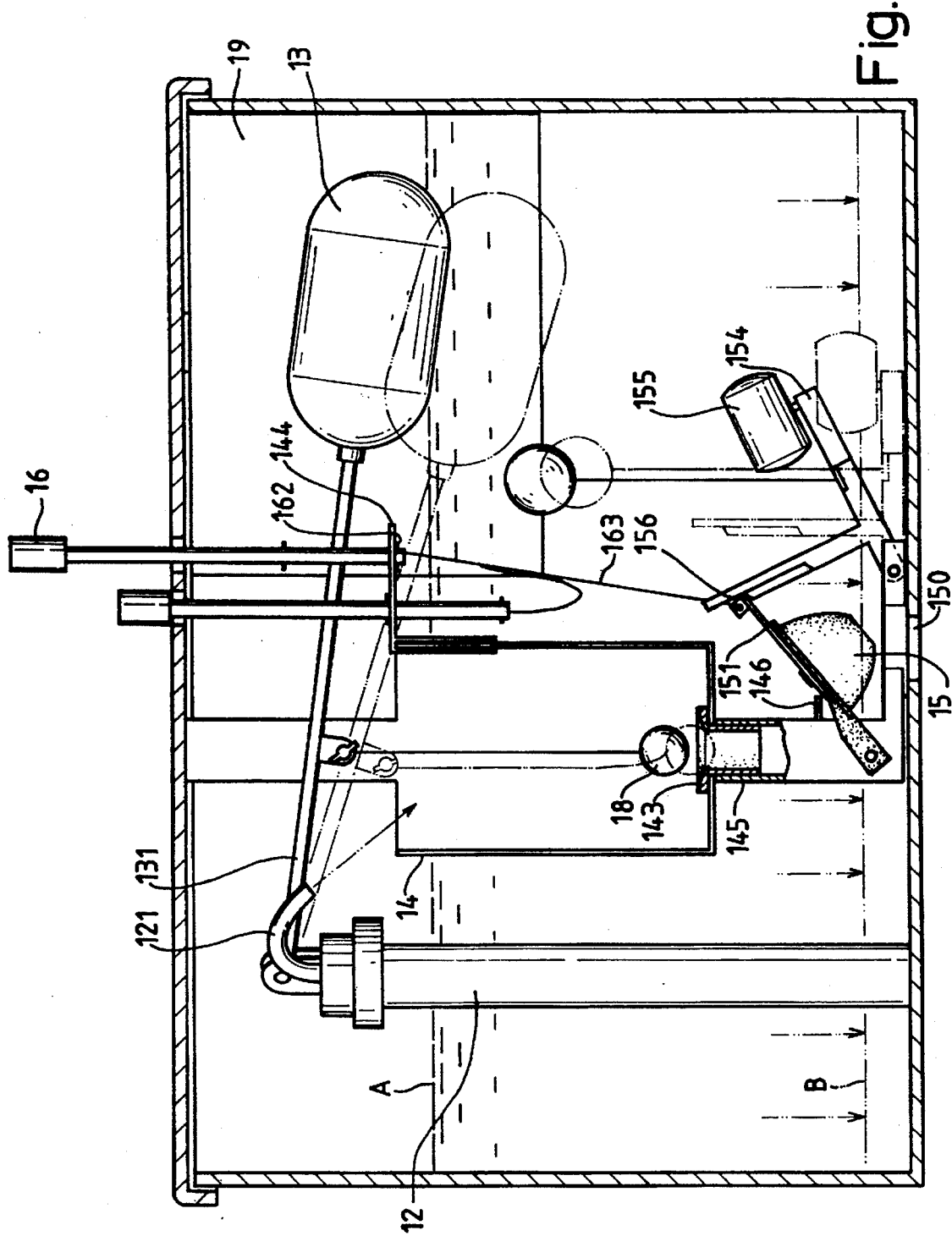
FIG. 5 is a schematic view showing the structure and operation of the tank assembly of the water saving toilet of this invention in the primary operation mode.

Referring to FIG. 5, to discharge solid excrements (in the primary operation mode), the primary lever 16 is pulled until the lower pin 162 comes to abut against the fixing seat 144. The primary control wire 163 thus pulled causes the water discharging valve 15 to be pivoted with the limiting block 146 serving to prevent excessive pivotal movement. Then the primary lever 16 is released and the front end edge of the actuating plate 151 on the discharging valve 15 becomes retained in the primary retaining groove 156 of the primary control seat 154. Then large quantity of water stored in the water tank 10 is discharged into the bowl 20 from the water discharging tube 150 until the water level lowers from level A to B. The primary float 155 on the primary control seat 154 will cause the primary control seat 154 to pivot to the position as shown in phantom line due to lack of buoyancy from the water. The front end of the actuating plate 151 on the water discharging valve 15 is released from retention by the primary retaining groove 156 of the primary control seat 154, thus quickly covers over the water discharging tube 150. Then the pivoted down float arm 131 causes the ball valve 18 to go down into position in close engagement with the locating seat 143 such that water starts to come out of the water outlet tube 121 of the water supplying tube 12 and go directly into the regulation container 14. The water first fills up the regulation container 14 and then overflows into the water tank 10, then the water level rises from B to A. The float ball 13 can be quickly raised into position by means of the effect of decreased cross section area of the top part of the water tank due to the acceleration blocks 19. Then the water flowing out from the water outlet tube 121 of the water supplying tube 12 is gradually decreased in quantity and weakened such that water can not be directly ejected into the regulation container 14, thereby to flow directly into the water tank 10 and cause the float ball 13 to go up further, and lift up the ball valve 18 to become separated from the locating seat 143. Then the water outlet tube 121 stops supplying water because of the float ball 13 coming into position. Right before this, the ball valve 18 is separated from the locating seat 143, and water in the regulation container 14 flows into the bowl 20 from the overflow tube 145 via the water discharging tube 150. After the water in the regulation container 14 is emptied, the water tank assembly 1 is returned to its standby condition as shown in FIG. 4.

Referring to FIG. 6, FIG. 6A shows the bowl in the standby condition under the primary operation mode wherein the water level 2E in the bowl 20 represents a water trap formed with only a small quantity of water After large quantity of water is flushed into the bowl 20 from the water discharging tube 150 as stated above, the water level therein rises quickly to 2F as shown in FIG. 6B which is above the 2A and the 2C respectively of the primary discharging line 21 and the secondary discharging line 22, and a siphonage effect will thus be resulted and the solid and liquid excretion in the bowl will be discharged by the water from both the primary discharging line 21 and the secondary discharging line 22 Moreover, because of the substantial difference in diameter between the primary and the secondary discharging lines 21 and 22, the solids can be discharged by the strong drawing force from the primary discharging line without clogging the secondary discharging line 22. After being fully discharged, there will be no solids in the bowl 20 as shown in FIG. 6C. Then as stated above, the water tank 10 has been filled with water, causing the float ball 13 to come into position and the ball valve 18 is lifted up such that the water stored in the regulation container 14 flows into the bowl 20 from the overflow tube 145 through the water discharging tube 150 and forms a water trap at the water level 2E, thus returning to the standby condition as shown in FIG. 6A.

Figure 7:
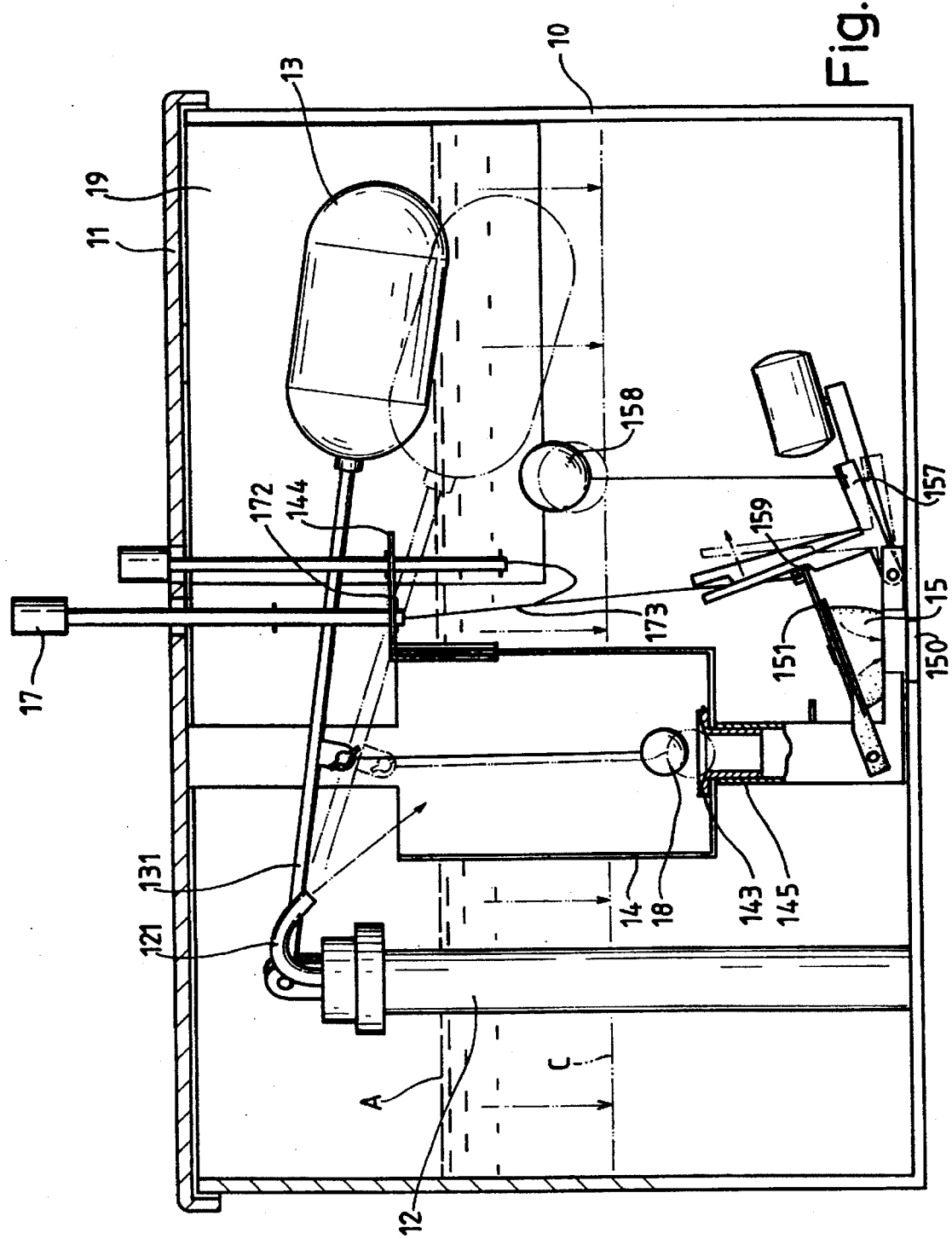
FIG. 7 is a schematic view showing the structure and operation of the tank assembly of the water saving toilet of this invention in the secondary operation mode.

Referring to FIG. 7, to discharge urine (in the secondary operation mode), the secondary lever 17 is pulled until the lower pin 172 comes to abut against the fixing seat 144. The relaxed secondary control wire 173 thus pulled cause the water discharging valve 15 to be pivoted up. Then the secondary lever 17 is released and the front end of the actuating plate 151 on the water discharging valve 15 becomes retained in the secondary retaining groove 159 of the secondary control seat 157. Then the water stored in the water tank 10 is quickly discharged into the bowl 20 from the water discharging tube 150 until the water level lowers quickly from A to C. Since the water level C has been below the secondary float 158, the secondary control seat 157 will pivot quickly to the position as shown in phantom line. The front end of the actuating plate 151 on the water discharging valve 15 is released from retention by the (secondary retaining groove 159) of the secondary control seat 157, thus to quickly covers over the water discharging tube 150. Then the pivoted down float arm 131 causes the ball valve 18 to go down into position in close engagement with the locating seat 143 such that water starts to flow from the water outlet tube 121 of the water supplying tube 12 and go directly into the regulation container 14. Water first fills into the regulation container 14 and then overflows into the water tank 10, and the water level rises gradually from C to A. The float ball 13 can be quickly raised into position by means of the effect of decreased cross section area of the top part of the water tank due to the acceleration blocks 19. Then the water flowing out of the water outlet tube 121 of the water supplying tube 12 is gradually decreased in quantity and weakened such that water can not be directly ejected into the regulation container 14, thereby to flow directly into the water tank 10 and cause the float ball 13 to go up further, and lift up the ball valve 18 to become separated from the locating seat 143. Then the water outlet tube 121 stops supplying water because of the float ball 13 coming into position. Right before this, the ball valve 18 is separated from the locating seat 143, water in the regulation container 14 flows into the bowl 20 from the overflow tube 145 via the water discharging tube 150. After the water in the regulation container 14 is emptied, the water tank assembly 1 is returned to its standby condition as shown in FIG. 4.

Referring to FIG. 8, FIG. 8A shows the bowl in the standby condition under the secondary operation mode wherein the water level 2E in the bowl 20 represents a water trap formed with only a small quantity of water. After the small quantity of water is flushed into the bowl 20 from the water discharging tube 150 as stated above, the water level therein rises quickly to 2G as shown in FIG. 8B which lies between the 2A and the 2C respectively of the primary discharging line 21 and the secondary discharging line 22, i.e., above the 2C of the secondary discharging line 22, a siphonage effect will thus be resulted in the secondary discharging line 22 and the urine in the bowl 20 will be discharged from the secondary discharging line 22 and completely emptied. As shown in FIG. 8C, after being fully discharged, then as stated above, the water tank 10 has been filled with water, causing the float ball 13 to come into position and the ball valve 18 to be lifted up such that the water stored in the regulation container 14 flows into the bowl 20 from the overflow tube 145 through the water discharging tube 150 and forms a water trap at the water level 2E, thus returning to the standby condition as shown in FIG. 8A.

From the foregoing, as compared to the conventional siphon or downwash type of toilets, it is apparent that the water saving toilet of this invention has the following technical advantages that have never been disclosed or suggested in prior art:

1. A regulation container 14 of unique design is disposed in combination with a special ball valve 18 arranged in a control assembly. With a preset capacity, when the water stored in the regulation container 14 is discharged into the bowl 20 and forms a water trap, this water trap can be controlled to be at a minimal level 2E enough to serve the water saving purpose. Moreover, through opening and closing the ball valve 18, the time when the water trap will be formed by first storing the water in the regulation container 14 and then discharging into the bowl 20 can be controlled. That is, the float arm 131 must be rotated almost into the uppermost position, then the ball valve 18 is opened and the water in the regulation container 14 is discharged. The time delay thus resulted allows the bowl to be flushed completely clean before water trap is formed.

2. Unique primary and secondary water discharging lines 21 and 22 are particularly designed to be formed with two points of siphonage starting height for making use of the siphon principle, the upper edge points 2A and 2C, that is, the highest points on the curved tubes of the primary and secondary discharging lines 21 and 22 respectively such that the water level of the spare water trap remains below the highest point of the secondary line at the lower edge point 2D which is lower than the highest point of the primary discharging line of this invention at the lower edge of the tube, the lower edge point 2B, as compared to the water trap in the conventional toilets, such that there actually exists a significant height difference, i.e., a substantial difference in the water quantity. In addition, through the function of the water discharging control mechanism comprising the primary lever 16, the secondary lever 17 and the water discharging valve 15, different quantity of water will be discharged into the bowl to form water level of different heights 2F and 2G such that different operation modes will be resulted according to the water level of different heights, that is, the primary operation mode (for discharging solids) is controlled with a primary lever and the secondary operation mode (for discharging only urine) is controlled with a secondary lever. In this manner, significant water saving effect can certainly be achieved by discharging different excretion in different operation modes.

While a preferred embodiment of this invention has been described, various changes and modifications can be made thereto by those skilled in the art without departing from the technical principles and spirit of this invention. It is intended that all such changes and modifications should be within the scope of the appended claims.

I claim:

1. A water saving toilet comprising a water tank assembly and a bowl assembly, said water tank assembly including:

a water tank which is a box body having an open top portion;

a lid for covering over the water tank and provided with a pair of holes each for a primary lever and a secondary lever;

a water supplying tube connectable to an external water pipe through the water tank and provided on the top portion with an arcuated and angularly extending water outlet tube and a pivotal seat;

a float ball coupled to a float arm, the distal end thereof being pivotally connected to the pivotal seat on the top of the water supplying tube;

a water discharging valve positioned on a water discharging tube communicating with the bowl assembly and provided on the top surface with an actuating plate and having a pivotal seat extending from one side;

a primary control seat and a secondary control seat both having a horizontal and a vertical tabs pivoted to the pivotal seat on the side of the water discharging tube by a pin, the vertical tabs being formed, respectively with a primary and secondary retaining grooves;

a primary and a secondary float connected to one end of the horizontal tabs of the primary and secondary control seat, respectively;

a primary and a secondary lever connected to a primary and a secondary control wire, respectively;

said bowl assembly including:
   a bowl; and
   a discharging line system; characterized in that a regulation container has a pair of fixed retaining plates for fastening on the top edge of the water tank such that the regulation container is positioned within the water tank, and the regulation container is provided on a bottom with An opening, a locating seat having a central passage and being fitted into the opening on the bottom of the regulation container, said locating seat extending into the discharging tube, and a fixing seat having a pair of fitting holes, said fixing seat being retained in position on a top edge of the regulation container; a ball valve is positioned on the locating seat in the regulation container which is connected to an adjusting wire, a distal end of the adjusting wire being coupled to a set screw on the float arm such that the distance between the ball valve and the locating seat can be adjusted by turning the set screw; and said discharging line system of said bowl assembly including a primary discharging line and a secondary discharging line wherein said secondary discharging line is connected at one end to the bowl and at another end to said primary discharging line.

2. The water saving toilet according to claim 1 wherein said primary lever and said secondary lever each have a flanged head which extends through the holes of the lid for pulling by a user's hand, and which are fitted and secured, respectively, into the fitting holes on the fixing seat, said primary lever and said secondary lever being further provided with an upper and a lower pin for limiting the travel of actuation of the primary and secondary levers, the primary lever being connected from below to a primary control wire, a distal end thereof being connected to a free end of the actuating plate on the water discharging valve, the secondary lever being connected from below to a secondary control wire, another end thereof being connected to the primary control wire in relaxed condition.

3. The water saving toilet according to claim 1 wherein said locating seat has an upwardly diverging, generally flared top mouth.

4. The water saving toilet according to claim 1 wherein said secondary discharging line is connected in communication with said bowl by an upper joint and with said primary discharging line by a lower joint.

5. The water saving toilet according to claim 1 wherein said primary and secondary discharging lines are disposed such that an upper edge point at a highest position of said primary discharging line is above an upper edge point at a highest position of said secondary discharging line.

6. The water saving toilet according to claim 1 wherein said water tank assembly further includes an acceleration block having a fixed retaining seat for retaining on the top edge of the water tank to be positioned on the inner wall of the water tank.

* * * * *